United States Patent
Iizuka

(10) Patent No.: US 8,372,918 B2
(45) Date of Patent: Feb. 12, 2013

(54) NITRILE GROUP-CONTAINING HIGHLY SATURATED COPOLYMER RUBBER

(75) Inventor: Takashi Iizuka, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 13/147,041

(22) PCT Filed: Jan. 29, 2010

(86) PCT No.: PCT/JP2010/051210
§ 371 (c)(1),
(2), (4) Date: Jul. 29, 2011

(87) PCT Pub. No.: WO2010/087431
PCT Pub. Date: Aug. 5, 2010

(65) Prior Publication Data
US 2011/0301300 A1  Dec. 8, 2011

(30) Foreign Application Priority Data
Jan. 30, 2009  (JP) .................................. 2009-019216

(51) Int. Cl.
C08L 13/00 (2006.01)
C08K 5/00 (2006.01)
(52) U.S. Cl. ........................ 525/328.9; 525/55; 525/379
(58) Field of Classification Search .................. 526/318, 526/297, 318.2, 320; 525/328.9, 55, 379
See application file for complete search history.

(56) References Cited

U.S. PATENT DOCUMENTS

| | | | |
|---|---|---|---|
| 6,657,014 B1 * | 12/2003 | Mori et al. ................. | 525/329.3 |
| 2009/0124741 A1 | 5/2009 | Nagamori et al. | |
| 2009/0186977 A1 * | 7/2009 | Nagamori et al. ............ | 524/556 |

FOREIGN PATENT DOCUMENTS

| | | | |
|---|---|---|---|
| JP | 2001-55471 A | | 2/2001 |
| JP | 2008-056793 | * | 3/2008 |
| JP | 2008-56793 A | | 3/2008 |
| JP | 2008-138048 A | | 6/2008 |
| JP | 2008-179663 A | | 8/2008 |
| WO | WO 2006/090734 A1 | | 8/2006 |
| WO | WO 2007/119848 A1 | | 10/2007 |

OTHER PUBLICATIONS

International Search Report, dated Mar. 30, 2010, issued in PCT/JP2010/051210.

* cited by examiner

*Primary Examiner* — Ling Choi
*Assistant Examiner* — Chun-Cheng Wang
(74) *Attorney, Agent, or Firm* — Birch, Stewart, Kolasch & Birch, LLP

(57) ABSTRACT

A nitrile-group-containing highly saturated copolymer rubber comprising α,β-ethylenically unsaturated nitrile monomer units (a) in 5 to 60 wt %, α,β-ethylenically unsaturated dicarboxylic acid mono ester monomer units (b) in 0.1 to 20 wt %, (meth)acrylic acid alkoxyalkyl ester monomer units which have alkoxyalkyl groups with 2 to 8 carbon atoms (c) in 11 to 50 wt %, and conjugated diene monomer units (d) in 20 to 83.9 wt %, where at least part of the conjugated diene monomer units (d) are hydrogenated.

8 Claims, No Drawings

NITRILE GROUP-CONTAINING HIGHLY SATURATED COPOLYMER RUBBER

TECHNICAL FIELD

The present invention relates to a nitrile group-containing highly saturated copolymer rubber, more particularly relates to a nitrile group-containing highly saturated copolymer rubber able to give a cross-linked product which is excellent in normal physical properties and superior in compression set resistance and has a good balance of oil resistance and cold resistance.

BACKGROUND ART

A nitrile group-containing highly saturated copolymer rubber such as a hydrogenated acrylonitrile-butadiene copolymer rubber is superior in heat resistance, oil resistance, ozone resistance, etc. compared with a general nitrile group-containing copolymer rubber high in a ratio of carbon-carbon unsaturated bonds in its main chain structures such as an acrylonitrile-butadiene copolymer rubber.

As the composition of such a nitrile-group-containing highly saturated copolymer rubber, for example, Patent Document 1 proposes a cross-linkable rubber composition containing a highly saturated nitrile rubber which has $\alpha,\beta$-ethylenically unsaturated dicarboxylic acid mono ester monomer units, a polyamine cross-linking agent, and a basic cross-linking accelerator. While a rubber cross-linked product which is improved in heat resistance and compression set is obtained by this composition, further improvement of the cold resistance has been desired.

PRIOR ART DOCUMENTS

Patent Documents

Patent Document 1: Japanese Patent Publication (A) No. 2001-55471 (Specification of U.S. Pat. No. 6,657,014)

DISCLOSURE OF THE INVENTION

Problem to be Solved by the Invention

The present invention has as its object to provide a nitrile group-containing highly saturated copolymer rubber able to give a cross-linked product which is excellent in normal physical properties and superior in compression set resistance and has a good balance of oil resistance and cold resistance. Further, the present invention has as its object to provide a cross-linkable rubber composition comprised of the nitrile group-containing highly saturated copolymer rubber to which a cross-linking agent is added and a rubber cross-linked product obtained by cross-linking the cross-linkable rubber composition.

Means for Solving the Problems

The inventors engaged in intensive research to solve the above problems and as a result discovered that by including, in a nitrile group-containing highly saturated copolymer rubber comprising $\alpha,\beta$-ethylenically unsaturated nitrile monomer units (a), $\alpha,\beta$-ethylenically unsaturated dicarboxylic acid mono ester monomer units (b), and conjugated diene monomer units (d), specific (meth)acrylic acid alkoxyalkyl ester monomer units (c) and making the ratios of these monomer units predetermined ranges, it is possible to achieve the above object and thereby completed the present invention.

That is, according to the present invention, there is provided a nitrile-group-containing highly saturated copolymer rubber comprising $\alpha,\beta$-ethylenically unsaturated nitrile monomer units (a) in 5 to 60 wt %, $\alpha,\beta$-ethylenically unsaturated dicarboxylic acid mono ester monomer units (b) in 0.1 to 20 wt %, (meth)acrylic acid alkoxyalkyl ester monomer units which have alkoxyalkyl groups with 2 to 8 carbon atoms (c) in 11 to 50 wt %, and conjugated diene monomer units (d) in 20 to 83.9 wt %, where at least part of the conjugated diene monomer units (d) are hydrogenated.

The nitrile-group-containing highly saturated copolymer rubber of the present invention has an iodine value of preferably 120 or less.

Further, the (meth)acrylic acid alkoxyalkyl ester monomer units (c) are preferably methoxyethyl acrylate units.

Further, the $\alpha,\beta$-ethylenically unsaturated dicarboxylic acid mono ester monomer units (b) are preferably mono n-butyl maleate units.

Further, according to the present invention, there is provided a cross-linkable rubber composition comprised of the nitrile-group-containing highly saturated copolymer rubber and cross-linking agent. As the cross-linking agent, a polyamine-based cross-linking agent is preferable.

Furthermore, according to the present invention, there is provide a rubber cross-linked product obtained by cross-linking the above cross-linkable rubber composition. The rubber cross-linked product of the present invention is preferably an O-ring.

Effects of the Invention

According to the present invention, it is possible to provide a nitrile group-containing highly saturated copolymer rubber able to give a cross-linked product which is excellent in normal physical properties and superior in compression set resistance and has a good balance of oil resistance and cold resistance and a rubber cross-linked product obtained by cross-linking this having the above properties.

DESCRIPTION OF EMBODIMENTS

Nitrile-Group-Containing Highly Saturated Copolymer Rubber

The nitrile-group-containing highly saturated copolymer rubber of the present invention comprises $\alpha,\beta$-ethylenically unsaturated nitrile monomer units (a) in 5 to 60 wt %, $\alpha,\beta$-ethylenically unsaturated dicarboxylic acid mono ester monomer units (b) in 0.1 to 20 wt %, (meth)acrylic acid alkoxyalkyl ester monomer units which have alkoxyalkyl groups with 2 to 8 carbon atoms (c) in 11 to 50 wt %, and conjugated diene monomer units (d) in 20 to 83.9 wt %, where at least part of the conjugated diene monomer units (d) are hydrogenated.

The $\alpha,\beta$-ethylenically unsaturated nitrile monomer forming the $\alpha,\beta$-ethylenically unsaturated nitrile monomer units (a) is not particularly limited so long as an $\alpha,\beta$-ethylenically unsaturated compound having nitrile groups. Acrylonitrile; $\alpha$-chloroacrylonitrile, $\alpha$-bromoacrylonitrile, or other $\alpha$-halogenoacrylonitrile; methacryonitrile, ethacryonitrile, or other $\alpha$-alkylacrylonitrile; etc. may be mentioned. Among these, acrylonitrile and methacryonitrile are preferable, while acrylonitrile is particularly preferable. As the $\alpha,\beta$-ethylenically unsaturated nitrile monomer, several of these may be jointly used.

The ratio of content of the α,β-ethylenically unsaturated nitrile monomer units in the nitrile-group-containing highly saturated copolymer rubber is, in the total monomer units, 5 to 60 wt %, preferably 8 to 40 wt %, more preferably 10 to 30 wt %, furthermore preferably 15 to 30 wt %. If the content of the α,β-ethylenically unsaturated nitrile monomer units (a) is too small, the obtained cross-linked product tends to fall in oil resistance. On the other hand, if too large, the obtained cross-linked product tends to fall in cold resistance.

The monomer which forms the α,β-ethylenically unsaturated dicarboxylic acid mono ester monomer units (b) is not particularly limited so long as a mono ester monomer of an α,β-ethylenically unsaturated dicarboxylic acid which has one nonesterified unsubstituted (free) carboxyl group. The unsubstituted carboxyl group is mainly used for cross-linking. By having the α,β-ethylenically unsaturated dicarboxylic acid mono ester monomer units (b), it is possible to make the obtained rubber cross-linked product one which is excellent in elongation and other mechanical properties and further is more superior in compression set resistance.

As the organic group bonding with the carbonyl group through the oxygen atom of the ester part of the α,β-ethylenically unsaturated dicarboxylic acid mono ester monomer, an alkyl group, cycloalkyl group, or alkylcycloalkyl group is preferable. An alkyl group is particularly preferable. Such an alkyl group of the organic group which is bonded with the carbonyl group is preferably one with 1 to 20 carbon atoms, more preferably 2 to 6. Further, a cycloalkyl group as the organic group which is bonded with the carbonyl group is preferably one with 5 to 12 carbon atoms, more preferably 6 to 10. Furthermore, an alkylcycloalkyl group as the organic group which is bonded with the carbonyl group is preferably one with 6 to 12 carbon atoms, more preferably 7 to 10. If the number of carbon atoms of the organic group which is bonded with the carbonyl group is too small, the processing stability when adding a cross-linking agent to obtain a cross-linkable rubber composition is liable to fall, while conversely if the number of carbon atoms becomes too large, the cross-linking speed becomes slower and the obtained rubber cross-linked product can fall in mechanical properties.

As specific examples of such α,β-ethylenically unsaturated dicarboxylic acid monoester monomers, monomethyl maleate, monoethyl maleate, monopropyl maleate, mono n-butyl maleate, and other maleic acid monoalkyl esters; monocyclopentyl maleate, monocyclohexyl maleate, monocycloheptyl maleate, and other maleic acid monocycloalkyl esters; monomethylcyclopentyl maleate, monoethylcyclohexyl maleate, and other maleic acid monoalkylcycloalkyl esters; monomethyl fumarate, monoethyl fumarate, monopropyl fumarate, mono n-butyl fumarate, and other fumaric acid monoalkyl esters; monocyclopentyl fumarate, monocyclohexyl fumarate, monocycloheptyl fumarate, and other fumaric acid monocycloalkyl esters; monomethylcyclopentyl fumarate, monoethylcyclohexyl fumarate, and other fumaric acid monoalkylcycloalkyl esters; monomethyl citraconate, monoethyl citraconate, monopropyl citraconate, mono n-butyl citraconate, and other citraconic acid monoalkyl esters; monocyclopentyl citraconate, monocyclohexyl citraconate, monocycloheptyl citraconate, and other citraconic acid monocycloalkyl esters; monomethylcyclopentyl citraconate, monoethylcyclohexyl citraconate, and other citraconic acid monoalkylcycloalkyl esters; monomethyl itaconate, monoethyl itaconate, monopropyl itaconate, mono n-butyl itaconate, and other itaconic acid monoalkyl esters; monocyclopentyl itaconate, monocyclohexyl itaconate, monocycloheptyl itaconate, and other itaconic acid monocycloalkyl esters; monomethylcyclopentyl itaconate, monoethylcyclohexyl itaconate, and other itaconic acid monoalkylcycloalkyl esters; etc. may be mentioned.

Among these as well, from the viewpoint of a more pronounced effect of the present invention, monopropyl maleate, mono n-butyl maleate, monopropyl fumarate, mono n-butyl fumarate, monopropyl citraconate, mono n-butyl citraconate; or another mono ester of a dicarboxylic acid having carboxyl groups at the two carbon atoms forming the α,β-ethylenically unsaturated bonds is preferable, while mono n-butyl maleate, monopropyl citraconate, or another mono ester of a dicarboxylic acid having the two carboxyl groups at the cis positions (cis arrangement) is preferable, while mono n-butyl maleate is particularly preferable.

The ratio of content of the α,β-ethylenically unsaturated dicarboxylic acid mono ester monomer units (b) in the nitrile-group-containing highly saturated copolymer rubber is, in the total monomer units, 0.1 to 20 wt %, preferably 0.2 to 15 wt %, more preferably 0.5 to 10 wt %, furthermore preferably 1 to 8 wt %. If the content of the α,β-ethylenically unsaturated dicarboxylic acid mono ester monomer units (b) is too small, the obtained rubber cross-linked product is liable to deteriorate in mechanical properties and compression set resistance. On the other hand, if too large, when adding a cross-linking agent and making a cross-linkable rubber composition, the scorch stability is liable to deteriorate and the obtained rubber cross-linked product is liable to drop in fatigue resistance.

The (meth)acrylic acid alkoxyalkyl ester monomer forming the (meth)acrylic acid alkoxyalkyl ester monomer units which have alkoxyalkyl groups with 2 to 8 carbon atoms (c) is not particularly limited so long as an ester compound of acrylic acid or methacrylic acid and an alcohol having an alkoxyalkyl group with 2 to 8 carbon atoms.

As such a (meth)acrylic acid alkoxyalkyl ester monomer, methoxymethyl (meth)acrylate (meaning methoxymethyl acrylate and/or methoxymethyl methacrylate, same below), methoxyethyl (meth)acrylate, ethoxymethyl (meth)acrylate, ethoxyethyl (meth)acrylate, n-propoxyethyl (meth)acrylate, i-propoxyethyl (meth)acrylate, n-butoxyethyl (meth)acrylate, i-butoxyethyl (meth)acrylate, t-butoxyethyl (meth)acrylate, methoxypropyl (meth)acrylate, methoxybutyl (meth)acrylate, etc. may be mentioned. Among these as well, one with alkoxyalkyl groups with 2 to 6 carbon atoms is preferable, one with 2 to 4 is more preferable, methoxyethyl acrylate and ethoxyethyl acrylate are furthermore preferable, methoxyethyl acrylate is particularly preferable, and 2-methoxyethyl acrylate is especially preferable.

The ratio of content of the (meth)acrylic acid alkoxyalkyl ester monomer units which have alkoxyalkyl groups with 2 to 8 carbon atoms (c) in the nitrile-group-containing highly saturated copolymer rubber is, in the total monomer units 11 to 50 wt %, preferably 16 to 50 wt %, more preferably 21 to 50 wt %, furthermore preferably 21 to 40 wt %. If the content of the (meth)acrylic acid alkoxyalkyl ester monomer units which have alkoxyalkyl groups with 2 to 8 carbon atoms (c) is too small, the obtained rubber cross-linked product tends to fall in oil resistance and cold resistance. On the other hand, if the content is too large, the obtained rubber cross-linked product tends to fall in fatigue resistance and sliding wear property.

As the conjugated diene monomer forming the conjugated diene monomer units (d), 1,3-butadiene, isoprene, 2,3-dimethyl-1,3-butadiene, 1,3-pentadiene, etc. may be mentioned. Among these as well, 1,3-butadiene is preferable.

The ratio of content of the conjugated diene monomer units (d) in the nitrile-group-containing highly saturated copolymer rubber is, in the total monomer units, 20 to 83.9 wt %, preferably 25 to 75.8 wt %, more preferably 30 to 68.5 wt %, furthermore preferably 30 to 63 wt %. Note that the conjugated diene monomer units (d) are contained in the nitrile-group-containing highly saturated copolymer rubber at least partially in a hydrogenated state. The ratio of content is the ratio including the conjugated diene monomer units (d) contained in the hydrogenated state. If the ratio of content of the conjugated diene monomer units (d) is too small, the obtained rubber cross-linked product is liable to fall in rubbery elasticity. On the other hand, if too large, the obtained rubber cross-linked product may be impaired in oil resistance, heat aging resistance, chemical resistant stability, etc.

Further, the nitrile-group-containing highly saturated copolymer rubber of the present invention may contain another monomer copolymerizable with the α,β-ethylenically unsaturated nitrile monomer units (a), α,β-ethylenically unsaturated dicarboxylic acid mono ester monomer units (b), (meth)acrylic acid alkoxyalkyl ester monomer units which have alkoxyalkyl groups with 2 to 8 carbon atoms (c), and conjugated diene monomer units (d). As the monomer forming the copolymerizable other monomer units, for example, an α,β-ethylenically unsaturated carboxylic acid ester monomer other than α,β-ethylenically unsaturated dicarboxylic acid mono ester monomer and (meth)acrylic acid alkoxyalkyl ester monomer units which have alkoxyalkyl groups with 2 to 8 carbon atoms, α,β-ethylenically unsaturated monocarboxylic acid monomer, α,β-ethylenically unsaturated polyvalent carboxylic acid monomer, α,β-ethylenically unsaturated polyvalent carboxylic acid anhydride monomer, aromatic vinyl monomer, fluorine-containing vinyl monomer, and copolymerizable anti-aging agent may be mentioned.

As the α,β-ethylenically unsaturated carboxylic acid ester monomer other than the α,β-ethylenically unsaturated dicarboxylic acid mono ester monomer and (meth)acrylic acid alkoxyalkyl ester monomer which has alkoxyalkyl groups with 2 to 8 carbon atoms, for example, methyl acrylate, ethyl acrylate, propyl acrylate, n-butyl acrylate, n-pentyl acrylate, 2-ethylhexyl acrylate, ethyl methacrylate, propyl methacrylate, or other (meth)acrylic acid alkyl ester monomer which has alkyl groups with 1 to 18 carbon atoms; (meth)acrylic acid alkoxyalkyl ester monomer which has alkoxyalkyl groups with 9 to 18 carbon atoms and has alkoxy groups with 1 to 12 carbon atoms; 2-aminoethyl acrylate, amino methyl methacrylate, or other amino-group-containing (meth)acrylic acid alkyl ester monomer which has alkyl groups with 1 to 16 carbon atoms; 2-hydroxyethyl acrylate, 3-hydroxypropyl methacrylate, or other (meth)acrylic acid hydroxyalkyl ester monomer which has alkyl groups with 1 to 16 carbon atoms; trifluoroethyl acrylate, difluoromethyl methacrylate, or other fluoroalkyl-group-containing (meth)acrylic acid alkyl ester monomer which has alkyl groups with 1 to 16 carbon atoms; dimethyl maleate, di-n-butyl maleate, or other maleic acid dialkyl ester which has alkyl groups with 1 to 18 carbon atoms; dimethyl fumarate, di-n-butyl fumarate, or other fumaric acid dialkyl ester which has alkyl groups with 1 to 18 carbon atoms; dicyclopentyl maleate, dicyclohexyl maleate, or other maleic acid dicycloalkyl ester which has cycloalkyl groups with 4 to 16 carbon atoms; dicyclopentyl fumarate, dicyclohexyl fumarate, or other fumaric acid dicycloalkyl ester which has cycloalkyl groups with 4 to 16 carbon atoms; dimethyl itaconate, di-n-butyl itaconate, or other itaconic acid dialkyl ester which has alkyl groups with 1 to 18 carbon atoms: dicyclohexyl itaconate or other itaconic acid dicycloalkyl ester which has cycloalkyl groups with 4 to 16 carbon atoms; etc. may be mentioned.

As the α,β-ethylenically unsaturated monocarboxylic acid monomer, acryl acid, methacrylic acid, crotonic acid, etc. may be mentioned.

As the α,β-ethylenically unsaturated polyvalent carboxylic acid monomer, itaconic acid, fumaric acid, maleic acid, etc. may be mentioned.

As the α,β-ethylenically unsaturated polyvalent carboxylic acid anhydride monomer, anhydrous maleic acid etc. may be mentioned.

As the aromatic vinyl monomer, styrene, α-methylstyrene, vinylpyridine, etc. may be mentioned.

As the fluorine-containing vinyl monomer, fluoroethylvinyl ether, fluoropropylvinyl ether, o-trifluoromethylstyrene, vinyl pentafluorobenzonate, difluoroethylene, tetrafluoroethylene, etc. may be mentioned.

As the copolymerizable anti-aging agent, N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline, N-phenyl-4-(4-vinylbenzyloxy)aniline, etc. may be mentioned.

Several of these copolymerizable other monomers may be used together. The content of the other monomer units is, with respect to the total monomer units forming the nitrile-group-containing highly saturated copolymer rubber, preferably 50 wt % or less, more preferably 40 wt % or less, furthermore preferably 10 wt % or less.

The nitrile-group-containing highly saturated copolymer rubber of the present invention has an iodine value of preferably 120 or less, more preferably 80 or less, furthermore preferably 25 or less. If the iodine value is too high, the obtained rubber cross-linked product is liable to drop in heat resistance and ozone resistance.

The nitrile-group-containing highly saturated copolymer rubber of the present invention has a Mooney viscosity [$ML_{1+4}$, 100° C.] of preferably 15 to 200, more preferably 15 to 150, furthermore preferably 15 to 100. If the polymer Mooney viscosity is too low, the obtained rubber cross-linked product is liable to fall in mechanical properties, while conversely if too high, the processability when adding a cross-linking agent to make a cross-linkable rubber composition may fall.

The method of production of the nitrile-group-containing highly saturated copolymer rubber of the present invention is not particularly limited, but the rubber is preferably produced by using emulsion polymerization using an emulsifier to copolymerize the above-mentioned monomer to prepare a latex of the nitrile-group-containing copolymer rubber and hydrogenating this. At the time of emulsion polymerization, it is possible to use an emulsifier, polymerization initiator, molecular weight adjuster, or other normally used secondary materials for polymerization.

The emulsifier is not particularly limited, but for example a polyoxyethylene alkyl ether, polyoxyethylene alkyl phenol ether, polyoxyethylene alkyl ester, polyoxyethylene sorbitan alkyl ester, or other nonionic emulsifier; a salt of myristic acid, palmitic acid, oleic acid, linolenic acid, or other salt of fatty acid, sodium dodecylbenzene sulfonate or other alkylbenzene sulfonate, higher alcohol sulfuric acid ester salt, alkylsulfosuccinate, or other anionic emulsifier; α,β-unsaturated carboxylic acid sulfo ester, α,β-unsaturated carboxylic acid sulfate ester, sulfoalkylaryl ether, or other copolymerizable emulsifier; etc. may be mentioned. The amount of the emulsifier used, with respect to 100 parts by weight of the total monomer, is preferably 0.1 to 10 parts by weight.

The polymerization initiator is not particularly limited so long as a radical initiator, but potassium persulfate, sodium persulfate, ammonium persulfate, potassium perphosphate, hydrogen peroxide, or other inorganic peroxide; t-butyl peroxide, cumen hydroperoxide, p-mentane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, t-butylperoxyisobutyrate, or other organic peroxides; azobis isobutyronitrile, azobis-2,4-dimethylvaleronitrile, azobiscyclohexane carbonitrile, methyl azobis isobutyrate, and other azo compounds; etc. may be mentioned. These polymerization initiators may be used alone or in combinations of two or more types. As the polymerization initiator, an inorganic or organic peroxide is preferable. When using a peroxide as the polymerization initiator, it is possible to combine it with sodium hydrogen sulfite, ferrous sulfate, or another reducing agent for use as a redox-type polymerization initiator. The amount of the polymerization initiator used is, with respect to 100 parts by weight of the total monomers, preferably 0.01 to 2 parts by weight.

The molecular weight adjuster is not particularly limited, but t-dodecylmercaptan, n-dodecylmercaptan, octyl mercaptan, or other mercaptans; carbon tetrachloride, dichloromethane, dibromomethane, or other halogenated hydrocarbons; α-methylstyrene dimer; tetraethyl thiuram disulfide, dipentamethylene thiuram disulfide, diisopropyl xanthogenate disulfide, and other sulfur-containing compounds etc. may be mentioned. These may be used alone or in combinations of two or more types. Among these as well, mercaptans are preferable, while t-dodecyl mercaptan is more preferable. The amount of molecular weight adjuster used is preferably 0.1 to 0.8 part by weight with respect to 100 parts by weight of the total monomers.

For the medium of the emulsion polymerization, usually water is used. The amount of water is preferably 80 to 500 parts by weight with respect to 100 parts by weight of the total monomers.

At the time of emulsion polymerization, further, in accordance with need, a stabilizer, dispersant, pH adjuster, deoxidizer, particle size adjuster, or other secondary materials for polymerization may also be used. When using these, the types and amounts of use are not particularly limited.

Further, by selectively hydrogenating the double bonds of the conjugated diene monomer units (d) of the obtained copolymer, it is possible to produce the nitrile-group-containing highly saturated copolymer rubber of the present invention. Note that the type and amount of the hydrogenation catalyst used for the hydrogenation and the hydrogenation temperature etc. may be determined in accordance with a known method.

Cross-Linkable Rubber Composition

The cross-linkable rubber composition of the present invention includes the above nitrile-group-containing highly saturated copolymer rubber and a cross-linking agent. The cross-linking agent used in the present invention is not particularly limited so long as it can cross-link the nitrile-group-containing highly saturated copolymer rubber of the present invention. A sulfur cross-linking agent, organic peroxide cross-linking agent, polyamine-based cross-linking agent, etc. may be mentioned. Among these, from the viewpoint of improvement of the compression set resistance, a polyamine-based cross-linking agent is preferable.

The polyamine-based cross-linking agent used in the present invention is not particularly limited so long as a compound having two or more amino groups or a compound of a form having two or more amino groups at the time of cross-linking, but a compound of an aliphatic hydrocarbon or aromatic hydrocarbon with a plurality of hydrogen atoms substituted by amino groups or hydrazide structures (structures expressed by —CONHNH$_2$, where CO indicates a carbonyl group) and a compound of that foint at the time of cross-linking is preferable. As a specific example, hexamethylene diamine, hexamethylene diamine carbamate, tetramethylene pentamine, hexamethylene diamine cinnamaldehyde adduct, hexamethylene diamine dibenzoate salt, or other aliphatic polyvalent amines; 2,2-bis{4-(4-aminophenoxy)phenyl}propane, 4,4'-methylene dianiline, m-phenylene diamine, p-phenylene diamine, 4,4'-methylene bis(o-chloroaniline), or other aromatic polyvalent amines; dihydrazide isophthalate, dihydrazide adipate, dihydrazide sebacate, or other compounds having two or more hydrazide structures; etc. may be mentioned. Among these as well, hexamethylene diamine carbamate is particularly preferable.

The amount of the cross-linking agent in the cross-linkable rubber composition of the present invention is, with respect to 100 parts by weight of the nitrile-group-containing highly saturated copolymer rubber, 0.1 to 20 parts by weight, preferably 0.2 to 15 parts by weight, more preferably 0.5 to 10 parts by weight. If the amount of the cross-linking agent is too small, the obtained rubber cross-linked product is liable to deteriorate in mechanical properties and compression set resistance. On the other hand, if too large, the obtained rubber cross-linked product may deteriorate in fatigue resistance.

Further, the cross-linkable rubber composition of the present invention preferably contains, in addition to the nitrile-group-containing highly saturated copolymer rubber and cross-linking agent, a basic cross-linking accelerator. By further including a basic cross-linking accelerator, the advantageous effect of the present invention becomes more pronounced.

As specific examples of the basic cross-linking accelerator, tetramethyl guanidine, tetraethyl guanidine, diphenyl guanidine, 1,3-di-o-tolyl guanidine or other tolyl guanidine, o-tolyl biguanide, di-o-tolyl guanidine salt of dicatechol borate, and other guanidine-based cross-linking accelerators; n-butyl aldehyde aniline, acetoaldehyde ammonia, and other aldehyde amine-based cross-linking accelerators; etc. may be mentioned. Among these as well, a guanidine-based cross-linking accelerator is preferable, while a 1,3-di-o-tolyl guanidine is particularly preferable.

The amount of the basic cross-linking accelerator in the cross-linkable rubber composition of the present invention is, with respect to 100 parts by weight of the nitrile-group-containing highly saturated copolymer rubber, preferably 0.1 to 20 parts by weight, more preferably 0.5 to 10 parts by weight, furthermore preferably 1 to 5 parts by weight. If the amount of the basic cross-linking accelerator is too small, the cross-linking rate of the cross-linkable rubber composition is too slow and the cross-linking density falls in some cases. On the other hand, if the amount is too large, the cross-linking rate of the cross-linkable rubber composition is too fast, scorching occurs, and the storage stability is impaired in some cases.

Further, the cross-linkable rubber composition of the present invention may include, in addition to the nitrile-group-containing highly saturated copolymer rubber and cross-linking agent and the basic cross-linking accelerator added in accordance with need, compounding agents normally used in the rubber field such as carbon black, silica, or other reinforcing fillers, calcium carbonate, clay, or other nonreinforcing fillers, cross-linking accelerators other than a basic cross-linking accelerator, cross-linking aids, cross-linking retarders, anti-aging agents, antioxidants, photo stabilizers, primary amine or other scorch preventers, plasticizers, processing aids, slip agents, tackifiers, lubrication agents, flame retardants, antifungal agents, acid acceptors, antistatic agents, pigments, etc. The amounts of these compounding agents are not particularly limited so long as in a range not detracting from the object and effects of the present invention. They can be blended in accordance with the purpose of compounding.

The cross-linkable rubber composition of the present invention may also have mixed into it a rubber other than the nitrile-group-containing highly saturated copolymer rubber of the present invention explained above. The amount in the cross-linkable rubber composition in the case of including a rubber other than the nitrile-group-containing highly saturated copolymer rubber is, with respect to 100 parts by weight of the nitrile-group-containing highly saturated copolymer rubber, preferably 30 parts by weight or less, more preferably 20 parts by weight or less, furthermore preferably 10 parts by weight or less.

The cross-linkable rubber composition of the present invention is prepared by mixing the above ingredients preferably in a nonaqueous system. The method of preparing the cross-linkable rubber composition of the present invention is not limited, but usually the ingredients other than the cross-linking agent and the thermally unstable cross-linking aid etc. primarily kneaded by a Bambury mixer, internal mixer, kneader, or other mixer, then transferred to rolls etc. The cross-linking agent and the thermally unstable cross-linking aid etc. are then added and secondarily kneaded.

The thus obtained cross-linkable rubber composition of the present invention has a compound Mooney viscosity [$ML_{1+4}$, 100° C.] of preferably 15 to 200, more preferably 20 to 175, furthermore preferably 25 to 150. It is superior in workability.

Rubber Cross-Linked Product

The rubber cross-linked product of the present invention is one obtained by cross-linking the above-mentioned cross-linkable rubber composition of the present invention.

The rubber cross-linked product of the present invention can be produced by using the cross-linkable rubber composition of the present invention, shaping it by a shaping machine designed for the desired shape, for example, an extruder, an injection molding machine, a compressor, rolls, etc., heating it for a cross-linking reaction, and thereby fixing the shape as a cross-linked product. In this case, this may be shaped in advance, then cross-linked or may be shaped and cross-linked simultaneously. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 6 hours.

Further, depending on the shape, size, etc. of the rubber cross-linked product, even if the surface is cross-linked, the inside may not be sufficiently cross-linked in some cases, so the composition may be further heated for secondary cross-linking.

As the heating method, press heating, steam heating, oven heating, hot air heating, or other general method used for cross-linking of rubber may be suitably selected.

The rubber cross-linked product of the present invention obtained in this way is excellent in normal physical properties, is superior in compression set resistance, and has a good balance of oil resistance and cold resistance.

For this reason, this rubber cross-linked product of the present invention can be used for O-rings, packings, diaphragms, oil seals, shaft seals, bearing seals, well head seals, air compressor seals, seals for sealing the chlorofluorocabon or fluorohydrocarbons or carbon dioxide used for cooling apparatuses of air-conditioners or compressors for cooling machines for air-conditioning systems, seals for sealing supercritical carbon dioxide or subcritical carbon dioxide used for washing media for precision washing, seals for roller devices (roller bearings, automobile hub units, automobile water pumps, linear guide devices, balls and screws, etc.), valves and valve seats, BOP (Blow Out Preventers), platters, and other various types of seal materials; and intake manifold gaskets attached at connecting part of intake manifold and cylinder head, cylinder head gaskets attached at connecting part of cylinder block and cylinder head, rocker cover gaskets attached at connecting part of rocker cover and cylinder head, oil pan gaskets attached at connecting part of oil pan and cylinder block or transmission case, fuel cell separator gaskets attached between a pair of housings sandwiching a unit cell provided with an anode, electrolyte plates, and cathode, top cover gaskets of hard disk drive, and other various types of gaskets; printing rolls, ironmaking rolls, papermaking rolls, industrial use rolls, office machinery rolls, and other various types of rolls; flat belts (film core flat belts, cord flat belts, laminated type flat belts, single unit type flat belts, etc.), V-belts (lapped V-belts, low edge V-belts, etc.), V-ribbed belts (single V-ribbed belts, double V-ribbed belts, lapped V-ribbed belts, back surface rubber V-ribbed belts, top cog V-ribbed belts, etc.), CVT belts, timing belts, toothed belts, conveyor belts, and other various belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flowlines, and other various types of hoses; CVJ boots, propeller shaft boots, constant velocity joint boots, rack and pinion boots, and other various types of boots; cushion materials, dynamic dampers, rubber couplings, air springs, vibration isolators and other damping material rubber parts; dust covers, car interior members, tires, covered cables, shoe soles, electromagnetic wave shields, flexible printed circuit board binders and other binders, fuel cell separators, and other broad applications in the fields of cosmetics and pharmaceuticals, fields coming into contact with food, the electronics field, etc. Among these in particular, the rubber cross-linked product of the present invention can be preferably used as a belt, hose, or seal material. In particular, it is suitable as a seal material. Among the seal materials, an O-ring is suitable.

EXAMPLES

Below, the present invention will be explained based on the detailed examples, but the present invention is not limited to these examples. Note that below, the "parts" are based on weight unless otherwise indicated. Further, the tests and evaluation were performed as below.

Composition of Nitrile-Group-Containing Highly Saturated Copolymer Rubber

The ratios of contents of the monomer units forming the nitrile-group-containing highly saturated copolymer rubber were measured by the following method.

That is, the ratio of content of the mono n-butyl maleate units was calculated by adding, to 2 tuft square pieces of nitrile-group-containing highly saturated copolymer rubber in an amount of 0.2 g, 2-butanone 100 ml, ethanol 20 ml, and water 10 ml and, while stirring, using potassium hydroxide in a 0.02N hydrous ethanol solution for titration at room temperature using thymol phthalein as an indicator so as to find the number of moles of carboxyl groups for 100 g of nitrile-group-containing highly saturated copolymer rubber and converting the found number of moles to the amount of mono n-butyl maleate units.

The ratios of contents of the 1,3-butadiene units and saturated butadiene units were calculated by measurement of the iodine value (according to JIS K 6235) using the nitrile-group-containing copolymer rubber before hydrogenation.

The ratio of content of the acrylonitrile units was calculated in accordance with JIS K6383 by measuring the nitrogen content in the nitrile-group-containing highly saturated copolymer rubber by the Kjeldahl method.

The ratios of contents of the methoxyethyl acrylate units and butyl acrylate units were calculated as the balance ingredients with respect to the above monomer units.

Iodine Value

The iodine value of the nitrile-group-containing highly saturated copolymer rubber was measured in accordance with JIS K 6235.

Mooney Viscosity (Polymer Mooney)

The Mooney viscosity (polymer Mooney) of the nitrile-group-containing highly saturated copolymer rubber was measured in accordance with JIS K6300-1 (unit: [$ML_{1+4}$, 100° C.]).

Normal Physical Properties (Tensile Strength, Elongation, 100% Tensile Stress, Hardness)

The cross-linkable rubber composition was placed in a vertical 15 cm, horizontal 15 cm, depth 0.2 cm mold, pressed by a press pressure of 10 MPa, and press formed at 170° C. for 20 minutes to obtain a sheet-shaped cross-linked product. Next, the obtained cross-linked product was transferred to a gear type oven and secondarily cross-linked at 170° C. for 4 hours, then the obtained sheet-shaped rubber cross-linked product was punched into a No. 3 dumbbell shape to prepare a test piece. Further, the obtained test piece was used to measure the tensile strength, elongation, and 100% tensile stress of the rubber cross-linked product in accordance with JIS K6251 and further the hardness of the rubber cross-linked product using a durometer hardness tester (type A) in accordance with JIS K6253.

O-Ring Compression Set

Using an inside diameter 30 mm and ring diameter 3 mm mold, a cross-linkable rubber composition was cross-linked at 170° C. for 20 minutes and a press pressure of 10 MPa, then was secondarily cross-linked at 170° C. for 4 hours to obtain an O-ring shaped test piece. Further, the obtained O-ring shaped test piece was used to measure the O-ring compression set according to JIS K6262 under the conditions of the O-ring shaped test piece sandwiched between two flat surfaces at a distance compressed 25% in the ring thickness direction held at 150° C. for 72 hours. The smaller this value, the better the compression set resistance.

Oil Resistance Immersion Test

The same procedure was used as the evaluation of the normal physical properties mentioned above for primary and secondary cross-linking to obtain a sheet-shaped rubber cross-linked product, then the obtained rubber cross-linked product was punched out to a size of 30 mm×20 mm×2 mm to obtain a test piece. Further, the obtained test piece was, in accordance with JIS K6258, immersed in test oil (IRM903) at 150° C. for 168 hours and measured for rate of change of volume before and after immersion (unit: %) to evaluate the oil resistance with respect to the test oil (IRM903). The smaller the value of the rate of change of volume before and after immersion, the smaller the degree of swelling due to the test oil and the better the oil resistance evaluated.

Cold Resistance

The same procedure was used as the evaluation of the normal physical properties mentioned above for primary and secondary cross-linking to obtain a sheet-shaped rubber cross-linked product, then the obtained rubber cross-linked product was punched out to a size of 40 mm×3 mm×2 mm to obtain a test piece. Further, the obtained test piece was, in accordance with JIS K 6261, evaluated by a Gehman's torsion teste and was evaluated by measuring the temperature $T_{10}$ (° C.) when the torsion angle becomes 10 times the torsion angle at a low temperature (23° C.). The lower the temperature of $T_{10}$, the better the cold resistance judged.

Synthesis Example 1

A metal bottle was charged with ion exchanged water in 180 parts, concentration 10 wt % sodium dodecylbenzene sulfonate aqueous solution in 25 parts, acrylonitrile in 20 parts, mono n-butyl maleate in 4.5 parts, methoxyethyl acrylate in 35.5 parts, and t-dodecylmercaptan (molecular weight adjuster) in 0.5 part in that order, was replaced in inside gas by nitrogen three times, then was charged with 1,3-butadiene in 40 parts. The metal bottle was held at 5° C. and was charged with cumen hydroperoxide (polymerization initiator) in 0.1 part, then a polymerization reaction was performed for 16 hours while rotating the metal bottle. Next, a concentration 10 wt % hydroquinone aqueous solution (polymerization inhibitor) in 0.1 part was added to stop the polymerization reaction, then a water temperature 60° C. rotary evaporator was used to remove the residual monomer to obtain a latex of a nitrile-group-containing copolymer rubber of acrylonitrile units in 21.3 wt %, mono n-butyl maleate units in 5.0 wt %, methoxyethyl acrylate units in 27.1 wt %, and butadiene units in 46.6 wt. % (solid content concentration about 30 wt %).

Next, the above produced latex and palladium catalyst (solution of mixture of 1 wt % palladium acetate acetone solution and equal weight of ion exchanged water) were added into an autoclave so that the palladium content to the dry weight of the rubber included in the above obtained latex is 1000 ppm and were subjected to a hydrogenation reaction at a hydrogen pressure of 3 MPa and a temperature of 50° C. for 6 hours to obtain a latex of the nitrile-group-containing highly saturated copolymer rubber.

To the obtained latex of the nitrile-group-containing highly saturated copolymer rubber, two volumes of methanol were added to solidify the latex, then the result was vacuum dried at 60° C. for 12 hours to obtain the nitrile-group-containing highly saturated copolymer rubber (A1). The obtained nitrile-group-containing highly saturated copolymer rubber (A1) had an iodine value of 10 and a polymer Mooney viscosity [$ML_{1+4}$, 100° C.] of 71. Further, the ratios of contents of the monomer units forming the obtained nitrile-group-containing highly saturated copolymer rubber (A1) are shown in Table 1.

Synthesis Example 2

Except for making the amounts of use of acrylonitrile, mono n-butyl maleate, methoxyethyl acrylate, and 1,3-butadiene the amounts shown in Table 1, the same procedure was followed as in Synthesis Example 1 to obtain the nitrile-group-containing highly saturated copolymer rubber (A2). The ratios of contents of the monomer units forming the obtained nitrile-group-containing highly saturated copolymer rubber (A2), the iodine value, and polymer Mooney viscosity are shown in Table 1.

Synthesis Examples 3 to 5

Except for making the amounts used of the acrylonitrile, mono n-butyl maleate, 1,3-budadiene, and butyl acrylate the amounts shown in Table 1, the same procedure was followed as in Synthesis Example 1 to obtain the nitrile-group-containing highly saturated copolymer rubbers (A3), (A4), and (A5). The ratios of contents of the monomer units forming the obtained nitrile-group-containing highly saturated copolymer rubber (A3), (A4), and (A5), the iodine values, and polymer Mooney viscosities are shown in Table 1.

Example 1

Using a Bambury mixer, to 100 parts by weight of the nitrile-group-containing highly saturated copolymer rubber (A1) obtained in Synthesis Examples 1, FEF carbon (product name "Seast SO", made by Tokai Carbon, carbon black) in 40 parts, tri-2-ethylhexyl trimellitate (product name "ADK Cizer C-8", made by ADEKA, plasticizer) in 5 parts, stearic acid (cross-linking acceleration aid) in 1 part, and 4,4-r-di-($\alpha,\alpha'$-dimethylbenzyl)diphenylamine (product name "Naugard 445", made by Crompton, anti-aging agent) in 1.5 parts were added and kneaded, then the mixture was transferred to rolls where 1,3-di-o-tolylguanidine (product name "Noccelar DT", made by Ouchi Shinko Chemical Industrial, cross-linking accelerator) in 2 parts, and hexamethylene diamine carbamate (product name: "Diak#1", made by Dupont Dow Elastomer, polyamine-based cross-linking agent) in 2.1 parts were added and mixed to prepare a cross-linkable rubber composition.

Further, by the above-mentioned method, the cross-linkable rubber composition prepared above was used to obtain a rubber cross-linked product. The obtained rubber cross-linked product was evaluated and tested for normal physical properties, O-ring compression set, oil resistance immersion test value, and cold resistance. The results are shown in Table 2.

Example 2

Except for using, instead of the nitrile-group-containing highly saturated copolymer rubber (A1) obtained in Synthesis Example 1, the nitrile-group-containing highly saturated copolymer rubber (A2) obtained in Synthesis Example 2, the same procedure was followed as in Example 1 to prepare a cross-linkable rubber composition and rubber cross-linked product. These were evaluated in the same way as Example 1. The results are shown in Table 2.

Comparative Example 1

Except for using, instead of the nitrile-group-containing highly saturated copolymer rubber (A1) obtained in Synthesis Example 1, the nitrile-group-containing highly saturated copolymer rubber (A3) obtained in Synthesis Example 3 and changing the amount of the polyamine-based cross-linking agent of hexamethylene diamine carbamate to 1.9 parts, the same procedure was followed as in Example 1 to prepare a cross-linkable rubber composition and rubber cross-linked product. These were evaluated in the same way as Example 1. The results are shown in Table 2.

Comparative Examples 2 and 3

Except for using, instead of the nitrile-group-containing highly saturated copolymer rubber (A1) obtained in Synthesis Example 1, nitrile-group-containing highly saturated copolymer rubbers (A4) and (A5) obtained in Synthesis Examples 4 and 5 respectively and except for using, instead of a polyamine-based cross-linking agent of hexamethylene diamine carbamate in 2.1 parts, an organic peroxide-based cross-linking agent of $\alpha,\alpha$-bis[t-butylperoxy]diisopropylbenzene (product name "Vul-Cup40KE", made by GEO Specialty Chemicals Inc.) in 10 parts and making the formulation the one shown in Table 2, the same procedure was followed as in Example 1 to prepare a cross-linkable rubber composition and rubber cross-linked product. These were evaluated in the same way as Example 1. The results are shown in Table 2.

TABLE 1

|  |  | Synthesis Examples | | | | |
|---|---|---|---|---|---|---|
|  |  | 1 (A1) | 2 (A2) | 3 (A3) | 4 (A4) | 5 (A5) |
| Amounts of use of monomers | | | | | | |
| Acrylonitrile | (parts) | 20 | 24 | 20.4 | 22.9 | 37 |
| Mono n-butyl maleate | (parts) | 4.5 | 4.5 | 5 | — | — |
| Methoxyethyl acrylate | (parts) | 35.5 | 31.5 | — | — | — |
| 1,3-butadiene | (parts) | 40 | 40 | 39.4 | 44.4 | 63 |
| Butylacrylate | (parts) | — | — | 35.2 | 32.7 | — |
| Nitrile-group-containing highly saturated copolymer rubber | | | | | | |
| Acrylonitrile units | (wt %) | 21.3 | 24.8 | 21 | 23 | 36 |
| Mono n-butyl maleate units | (wt %) | 5.0 | 4.9 | 4.5 | — | — |
| Methoxyethyl acrylate units | (wt %) | 27.1 | 23.0 | — | — | — |
| 1,3-butadiene units and saturated butadiene units | (wt %) | 46.6 | 47.3 | 44 | 44 | 64 |
| Butyl acrylate units | (wt %) | — | — | 30.5 | 33 | — |
| Iodine value |  | 10 | 8 | 8 | 15 | 11 |
| Polymer Mooney viscosity (ML$_{1+4}$, 100° C.) |  | 71 | 68 | 70 | 75 | 85 |

TABLE 2

|  |  | Examples | | Comparative Examples | | |
|---|---|---|---|---|---|---|
|  |  | 1 | 2 | 1 | 2 | 3 |
| Composition of nitrile-group-containing highly saturated copolymer rubber | | | | | | |
| Acrylonitrile units | (wt %) | 21.3 | 24.8 | 21 | 23 | 36 |
| Mono n-butyl maleate units | (wt %) | 5.0 | 4.9 | 4.5 | — | — |
| Methoxyethyl acrylate units | (wt %) | 27.1 | 23.0 | — | — | — |

TABLE 2-continued

|  |  | Examples | | Comparative Examples | | |
|---|---|---|---|---|---|---|
|  |  | 1 | 2 | 1 | 2 | 3 |
| 1,3-butadiene units and saturated butadiene units | (wt %) | 46.6 | 47.3 | 44 | 44 | 64 |
| Butyl acrylate units | (wt %) | — | — | 30.5 | 33 | — |
| *Composition of cross-linkable rubber composition* | | | | | | |
| Nitrile-group-containing highly saturated copolymer rubber | (parts) | 100 | 100 | 100 | 100 | 100 |
| Carbon black | (parts) | 40 | 40 | 40 | 40 | 40 |
| Tri-2-ethylhexyl trimellitate | (parts) | 5 | 5 | 5 | 5 | 5 |
| Stearic acid | (parts) | 1 | 1 | 1 | 1 | 1 |
| 4,4'-di-(α,α'-dimethylbenzyl)diphenyl-amine | (parts) | 1.5 | 1.5 | 1.5 | 1.5 | 1.5 |
| 1,3'-di-o-tolyl guanidine | (parts) | 2 | 2 | 2 | — | — |
| Hexamethylene diamine carbamate | (parts) | 2.1 | 2.1 | 1.9 | — | — |
| α,α-bis[t-butylperoxy]diisopropyl-benzene | (parts) | — | — | — | 10 | 10 |
| *Physicality of rubber cross-linked product* | | | | | | |
| Tensile strength | (MPa) | 16.8 | 18.0 | 18.5 | 20.6 | 26.9 |
| Elongation | (%) | 200 | 220 | 230 | 240 | 300 |
| 100% tensile stress | (MPa) | 6.0 | 6.0 | 5.4 | 5.5 | 5.9 |
| Hardness | (Duro-A) | 67 | 67 | 66 | 67 | 73 |
| O-ring compression set | (%) | 56 | 57 | 56 | 85 | 84 |
| Oil resistance immersion test (IRM903, rate of change ΔV) | (%) | +16.7 | +12.5 | +25.1 | +28.3 | +14.5 |
| Cold resistance ($T_{10}$) | (° C.) | −29 | −24.6 | −32 | −33.6 | −21.6 |

From Table 1, the cross-linked product obtained by using the nitrile-group-containing highly saturated copolymer rubber having the predetermined composition of the present invention, is excellent in normal physical properties, is superior in compression set resistance, and has a good balance in oil resistance and cold resistance (Examples 1 and 2).

As opposed to this, when not including (meth)acrylic acid alkoxyalkyl ester monomer units which have alkoxyalkyl groups with 2 to 8 carbon atoms (c), the balance between the oil resistance and the cold resistance becomes poor (Comparative Examples 1 and 2) and the compression set resistance becomes inferior (Comparative Example 3).

The invention claimed is:

1. A nitrile-group-containing highly saturated copolymer rubber comprising α,β-ethylenically unsaturated nitrile monomer units (a) in 10 to 30 wt %, α,β-ethylenically unsaturated dicarboxylic acid mono ester monomer units (b) in 0.5 to 10 wt %, (meth)acrylic acid alkoxyalkyl ester monomer units which have alkoxyalkyl groups with 2 to 8 carbon atoms (c) in 21 to 50 wt %, and conjugated diene monomer units (d) in 30 to 68.5 wt %, where at least part of said conjugated diene monomer units (d) are hydrogenated.

2. The nitrile-group-containing highly saturated copolymer rubber as set forth in claim 1, wherein the iodine value is 120 or less.

3. The nitrile-group-containing highly saturated copolymer rubber as set forth in claim 1, wherein said (meth)acrylic acid alkoxyalkyl ester monomer units (c) are methoxyethyl acrylate units.

4. The nitrile-group-containing highly saturated copolymer rubber as set forth in claim 1, wherein said α,β-ethylenically unsaturated dicarboxylic acid mono ester monomer units (b) are mono n-butyl maleate units.

5. A cross-linkable rubber composition comprised of a nitrile-group-containing highly saturated copolymer rubber as set forth in claim 1 and a cross-linking agent.

6. The cross-linkable rubber composition as set forth in claim 5, wherein said cross-linking agent is a polyamine-based cross-linking agent.

7. A rubber cross-linked product obtained by cross-linking the cross-linkable rubber composition as set forth in claim 5.

8. The rubber cross-linked product as set forth in claim 7, which is an O-ring.

\* \* \* \* \*